United States Patent [19]

Halldorsson

[11] Patent Number: 4,790,641
[45] Date of Patent: Dec. 13, 1988

[54] SPACE TELESCOPE CONNECTED TO A STAR TRACKER

[75] Inventor: Thorsteinn Halldorsson, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 937,366

[22] Filed: Dec. 3, 1986

[30] Foreign Application Priority Data

Jan. 11, 1986 [DE] Fed. Rep. of Germany ....... 3600658

[51] Int. Cl.$^4$ ...................... G02B 23/00; G01B 11/26; G01J 1/32
[52] U.S. Cl. .................................. 350/537; 350/568; 350/96.25; 250/203; 356/152
[58] Field of Search ............... 350/537, 557, 558, 567, 350/568, 174, 96.25; 356/153, 138, 152; 250/203 R

[56] References Cited

U.S. PATENT DOCUMENTS 4,083,636 4/1978 Owen ............................. 250/203 R
4,453,224 6/1984 Crooks, Jr. ..................... 350/162.16
4,571,023 2/1986 Ono ................................. 350/96.25

Primary Examiner—John K. Corbin
Assistant Examiner—Jay Ryan
Attorney, Agent, or Firm—W. G. Fasse; D. H. Kane, Jr.

[57] ABSTRACT

In order to be able to determine in a simple manner the angular deviations between the optical axes (OT, OS) of a telescope lens (2) and of a star tracker lens (8) which arise during the course of operation of a space telescope due to external influences, the entry (7a) of an orderly arranged light conductor bundle (7) is arranged in the focal plane ($f_t$) of the space telescope lens (2) and the exit (7b) of the light conductor bundle (7) is lead into the focal plane ($f_k$) of a collimator (9) arranged in the object-side opening of the star tracker lens (8). The angular deviation is determined by comparing the coordinates ($y_o$, $z_o$, $y'_o$, $z'_o$) of the images (S, S') of a reference star arising in the space telescope and in the star tracker. The collimator (9) may be mounted at the edge of the star tracker opening and a prism system (10, 11) may be provided for reflecting or imaging its beam path into the beam path of the star tracker.

7 Claims, 3 Drawing Sheets

SPACE TELESCOPE CONNECTED TO A STAR TRACKER

FIELD OF THE INVENTION

The invention relates to a space telescope connected to a star tracker and to a method for determining angular deviations between the optical axes of the telescope and of the star tracker caused by external influences.

DESCRIPTION OF THE PRIOR ART

More and more frequently telescopes are sent into an orbit around the earth for astronomical observations in space. In the UV, visible and IR spectral ranges only mirror telescopes with a folded ray path are used, due to their good imaging characteristics and due to their compact construction. In a known method a so-called "star tracker" or star sensor is utilized for directing or aiming the telescope. The star tracker is rigidly mounted on the telescope, or rather, on the orientation platform and is aligned with its main axis parallel to the optical axis of the telescope.

The star tracker is in the form of a small telescope with a position sensitive detector such as an "image disector tube" or a "charge coupled device" connected in series with the telescope. The position detector has a considerably larger field of view compared to that of the main telescope. The purpose of the star tracker is to exactly measure the position of known stars relative to its axis. Then the axis orientation of the observation telescope may also be determined from the thus measured positions of the reference stars. The desired orientation or alignment accuracies depend upon the size of the telescope and on the spectral range being used and lie in the order of magnitude of one arc second or better. Stars of the brightness magnitude $Mv = +2$ to $+8$ are used as reference stars and the field of view of the star tracker mostly amounts to a few square degrees.

Thermal changes are the problem which arise in said method and to which the invention relates. Such thermal changes affect the total structure of the telescope-star tracker and of the orientation or alignment platform. Due to the orbital motion and the continual new orientation of the telescope and the platform during sky observations, time varying angular deviations arise between the axes of the telescope and of the star tracker relative to one another. In order that the desired orientation accuracy may be achieved, these angular deviations must be measured from time to time during the entire mission by means of a measuring system specially constructed for this purpose and referred to as the so-called orientation control system. The expected angular deviations lie in the range of a few ten arc seconds and the required measuring accuracy of the orientation control system lies in the order of magnitude of one arc second.

The telescope and the measuring instruments are usually mounted together on an instrument platform so that it may be assumed that they have a rigid connection with each other throughout the course of a mission in orbit and are only in motion relative to the star tracker as a single unit.

Until now, there have been two fundamental concepts for the orientation control system. In one concept a natural star is centered through the telescope onto a position sensitive sensor at the focal plane of the telescope and simultaneously the orientation of the telescope is measured at the star tracker. In the second concept the collimated light beam of an artificial star which is rigidly connected with the instrument platform in the telescope, is conducted through the telescope wall to the outside by means of a suitable chain of prisms. The light beam is then mirrored into the receiving aperture of the star tracker. The image position of the artificial star gives the momentary position of the instrument platform.

Both concepts have several disadvantages. IR-telescopes are typically cooled to temperatures below 10° K. At these low temperatures several problems arise during the operation of the position sensitive semiconductor sensors. In the commercial detectors such as quadrant sensors or silicon based CCD, some of the charge carriers freeze up completely and the preamplifiers must be heated to 80° K. which leads to an undesired high temperature loading of the instrument chamber.

In the operation of non-cooled telescopes, the inherent noise of the detectors and of the preamplifier is relatively high and only relatively bright reference stars may be used.

In the second concept the calibrating beam must lead through a chain of triple prisms so that a possible position change of the prisms would have no effect on the beam path. Overall, this method is optically and mechanically very complicated and costly.

OBJECT OF THE INVENTION

It is the object of the invention to further develope a telescope of the above described type in such a manner that angular deviations between the optical axes of the telescope and of the star tracker may reliably be determined by simple means.

SUMMARY OF THE INVENTION

According to the invention the stated objective is achieved in that the images projected by the telescope lens are transmitted to the star tracker through an orderly arranged light conductor bundle. A method according to the invention for determining the angular deviations between the optical axes of the telescope and of the star tracker compares the coordinates of an image of the reference star projected by the telescope with the respective coordinates of a reference star image formed in the star tracker.

BRIEF DESCRIPTION OF THE DRAWINGS

Characteristic details of the invention will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
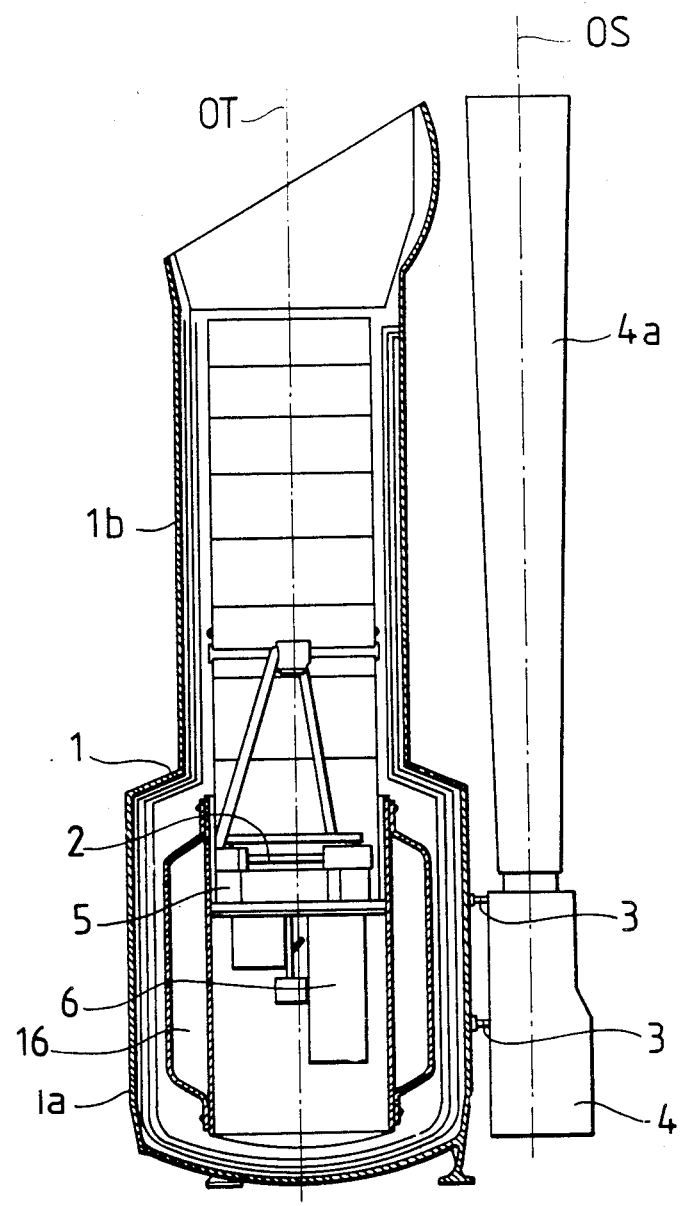
FIG. 1 shows an IR-telescope connected to a star tracker.

According to FIG. 1, a star tracker 4 is secured by means of struts 3 to a housing 1 of a space telescope 2 suitable for the observation of IR-images. The telescope 2 is arranged on an instrument platform 5. Measuring instruments 6 cooperating with the telescope are attached to the bottom of the platform 5. A cryostat 16 for maintaining a constant low temperature at the instrument platform 5 is located in the lower part 1a of the telescope housing 1 while the upper tube shaped housing part 1b and the tube-shaped housing part 4a of the star tracker 4 block scattered light.

The optical axis OT of the telescope objective and the optical axis OS of the star tracker objective shown with dash-dotted lines, are brought into an exact parallel position relative to one another during the assembly of the telescope. This initial parallel alignment however, cannot be maintained with sufficient accuracy during the utilization of the telescope in space due to the above described reasons. Thus, when adjusting the star tracker onto a specific reference star, there is no guarantee that the telescope is also adjusted exactly onto the respective star. For determining the angular deviations arising during operation of the telescope between said optical axes of the telescope and of the star tracker, the optical beam paths of the star tracker and of the telescope are connected to each other by means of an orderly arranged light conductor bundle in a manner described in more detail in the following.

Figure 2A:
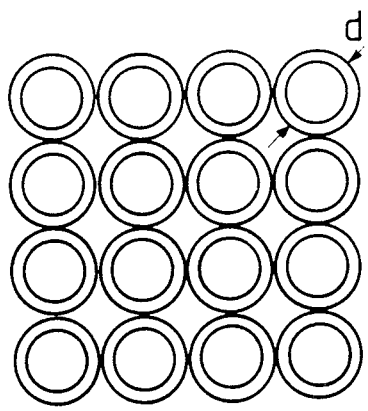
FIGS. 2a, 2b, and 2c illustrate the entrance and exit pupils of different orderly arranged light conductor bundles.
Figure 2B:
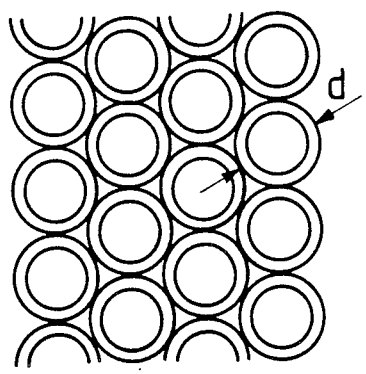
Figure 2C:
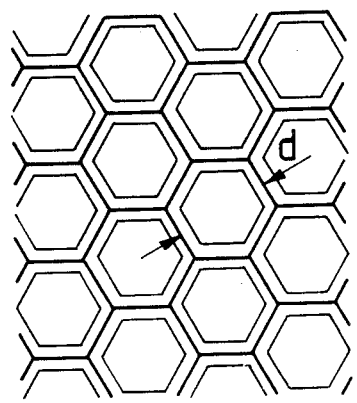

In FIG. 2 the entry and exit apertures of three different packing arrangements of light conductor bundles available in the trade are shown. FIG. 2a shows a square packing. FIG. 2b shows a triangular packing, and FIG. 2c shows a hexagonal packing. The diameter d of a single strand end is customarily ten microns. The diameter of a star being imaged through the telescope typically lies in the order of magnitude of one arc second, or for typical focal lengths of four to nine meters for medium sized IR-telescopes, in the order of 20 microns to 50 microns. An additional magnification of the star image is achievable by the focussed imaging onto the bundle end. A reduction of the star image is possible by means of interposed positive lenses.

The bundle diameter usually lies in the order of magnitude of 1 to 4 mm and thereby typically encompasses a field of view of 30 arc seconds to 2 arc minutes.

Figure 3:
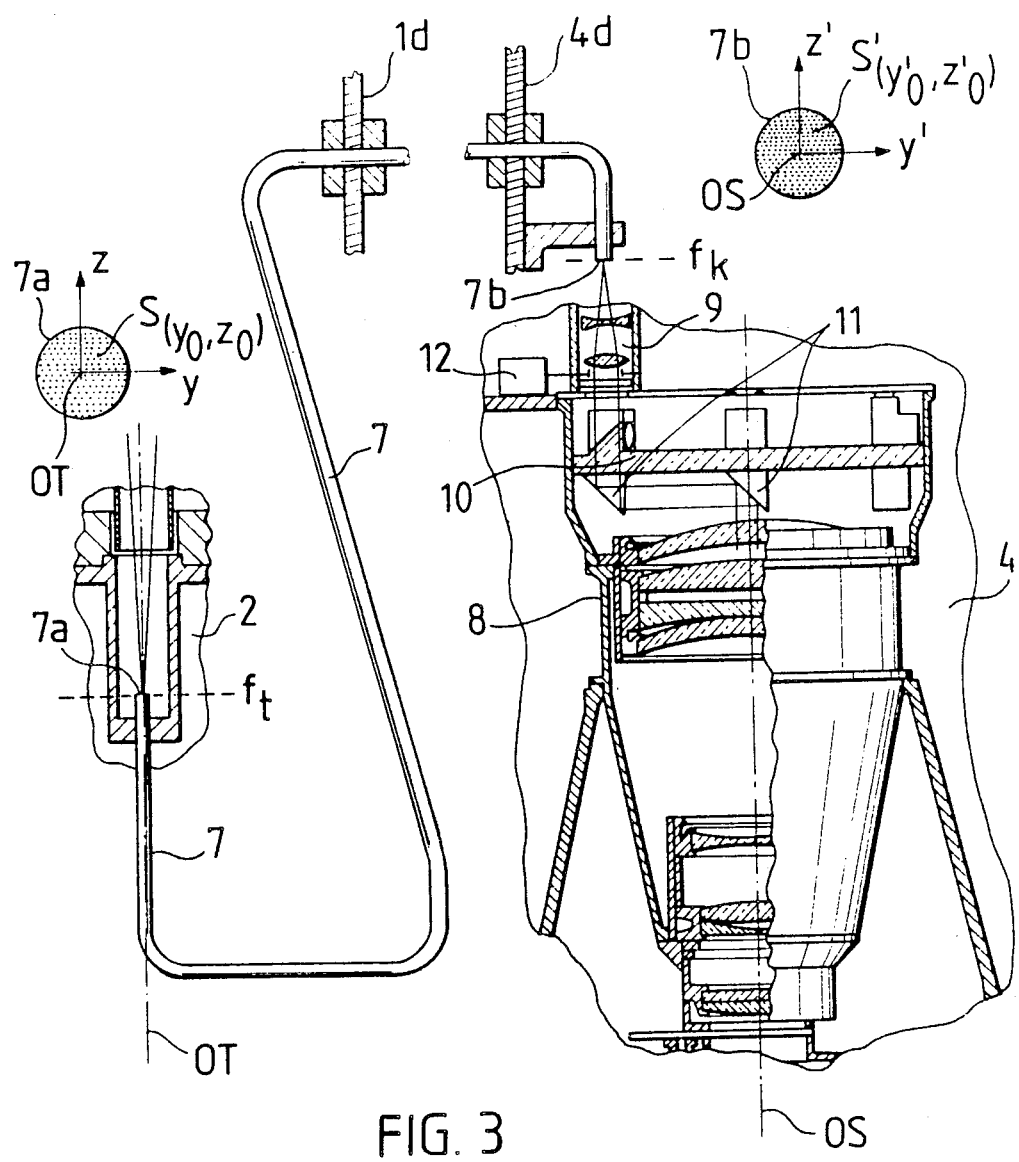
FIG. 3 shows the connection according to the invention, of the optical beam paths of the telescope and of the star tracker by means of an orderly arranged light conducting bundle.

According to FIG. 3 the entry 7a of an orderly arranged light conductor bundle 7, is arranged in the focal plane $f_t$ of the telescope lens 2. The light conductor bundle 7 passes out of the telescope in a vacuum-tight manner at a location 1d of the telescope housing 1 and passes into the star tracker 4 in a vacuum-tight manner at a location 4d of the star tracker housing. The exit end defining a plane 7b of the light conductor bundle 7 is attached at the object-side opening of the star tracker lens 8 to the housing of a collimator lens 9 so that it coincides with the focal plane $f_k$ of the collimator lens 9. The light conductor exit end plane 7b and the collimator lens 9 must be a closed mechanical unit, for example, a tube which is rigidly connected with the star tracker.

The image of the exit end plane 7b is imaged into the beam path of the star tracker by means of a prism system 11 built into a transparent plate 10. Due to this imaging all image elements existing at the exit of the light conductor bundle, are imaged through the star tracker lens 8 in the same manner as an object in the object plane of this lens, that is stars forming a point source at a practically infinite distance.

The image S of a reference star at the focal plane $f_t$ of the telescope or rather at the entry 7a of the light conductor bundle 7, has the coordinates $y_o$, $z_o$ relative to the optical axis OT of the telescope. This image X emerges at the exit 7b of the light conductor bundle 7 and hence also in the focal plane of the star tracker lens or objective 8 as an image S' with the coordinates $y'_o$, $z'_o$. By comparing these coordinates the angular deviation between the optical axes OT of the telescope and OS of the star tracker may be determined. It is practical to image the reference star in the optical axis OT of the telescope so that the coordinates $y'_o$, $z'_o$ directly give the magnitude of the angular deviation without further calculation.

The collimator lens or objective is arranged so that the star is imaged practically at the limit of diffraction. This usually requires a relatively long focal length of the collimator lens or a focal length of 20 cm to 40 cm for a star size of 20 microns (μm) to 40 microns (μm). In order that the optical elements do not become necessarily long, it is recommended to employ a structure in the manner of a telephoto lens with a folded beam path.

A particular characteristic of the optical structure according to the invention is the alteration of the image magnification scale of the star image through the light conductor compared with the direct observation of the star with the star tracker. If the angular difference of the star relative to the optical axis of the telescope is $\Delta\Phi$ then this angular difference arises at the collimated beam of the star image at the light bundle exit as $\Delta\Psi$.

$$\Delta\psi = \frac{F_{Tel}}{F_{Coll}} \cdot \Delta\Phi$$

whereby $F_{Tel}$ is the focal length of the telescope and $F_{Coll}$ is the focal length of the collimation lens. Because the focal length of the telescope usually is considerably larger than that of the collimation lens this indicates a considerable increase in the angular resolution. In order that the correction angle is indicated by the star tracker, the measured angular value must be scaled down by a factor $F_{Coll}/F_{Tel}$ in the software of the tracker.

The diameter of the telescope $D_{Tel}$ is usually considerably larger than that of the star tracker $D_{St}$. The light power I received through the light conductor is thus given as $$I = T\left(\frac{D_{Tel}^2}{D_{St}}\right) \cdot I_o$$

wherein $I_o$ is the light power of the same star for a direct imaging through the star tracker, and T is the transmission of the light conductor bundle, usually with T=0.5.

Because the quadratic ratio of the apertures usually is very large, it is possible, by using the suggested arrangement, to detect much weaker reference stars than the star tracker is able to detect in a direct path. It is understood that this is an advantage due to the larger number of weaker stars.

It is not necessary that the star light which is being conducted through the light conductor, is identical to the light of the star that is being followed by the star tracker, though this will often be the case.

The collimating optics at the light conductor end must be mounted as rigidly as possible at the opening of the star tracker so that the exit aperture of the light conductor bundle remains stationary in the field of view of the star tracker.

In order to prevent interfering light admission into the star tracker during the measurements carried out by the star light tracker alone, or rather for an unambiguous indentification of the star which is being conducted through the telescope, the beam path of the collimator lens 9 is temporarily interruptable by means of an optical shutter 12.

Although the invention has been described with reference to specific example embodiments, it will be appreciated that it is intended to cover all modifications and equivalents within the scope of the appended claims.

I claim:

1. A space telescope connected to a star tracker, comprising a telescope lens, an instrument platform orientable toward a reference star by means of said star tracker, optical means arranged for transmitting images projected from said telescope lens into a beam path of the star tracker, said optical means including a collimator lens and an orderly arranged light conductor bundle (7) having an entry end arranged in the focal plane ($f_t$) of said telescope lens (2), said light conductor bundle having an exit end (7b) leading into the focal plane ($f_k$) of said collimator lens (9) arranged on that side of a star tracker lens (8) which faces an object.

2. The telescope according to claim 1, wherein said collimator lens (9) comprises a focal length which is considerably greater than the focal length of the star tracker lens (8).

3. The telescope according to claim 1, wherein said collimator lens (9) is embodied as a telephoto lens or objective.

4. The telescope according to claim 1, wherein said collimator lens (9) is arranged at the edge of the star tracker lens (8) on that side of said star tracker lens which faces an object, and wherein a prism system (10, 11) is provided for reflecting a beam path of said collimator lens into the beam path of said star tracker lens (8).

5. The telescope according to claim 4, further comprising an optical shutter for interrupting said collimator beam path.

6. A method for determining angular deviations caused by outside influences between an optical axes of a telescope and of a star tracker interconnected with said telescope, comprising the following steps, aiming the telescope (1) toward a reference star detected by the star tracker (2), conducting an image (S) of the reference star which is created in the focal plane of the telescope by means of an orderly arranged light conductor bundle (7) to a collimator (9) rigidly arranged on that side of a star tracker lens which faces an object, and comparing the coordinates ($y_o$, $z_o$) of an image (S) of said reference star projected by the telescope (1) with the coordinates ($y'_o$, $z'_o$) of an image (S') of said reference star formed in the star tracker.

7. The method according to claim 6, wherein the image (S) of the reference star is created on the optical axis (OT) of the telescope.

* * * * *